United States Patent [19]
Stolen

[11] 3,875,422
[45] Apr. 1, 1975

[54] FOUR PHOTON PARAMETRIC AMPLIFICATION IN GLASSY OPTICAL WAVEGUIDES

[75] Inventor: Rogers Hall Stolen, Rumson, N.J.

[73] Assignee: Bell Telephone Laboratories Incorporated, Murray Hill, N.J.

[22] Filed: July 24, 1974

[21] Appl. No.: 491,267

[52] U.S. Cl................ 307/88.3, 321/69 R, 330/4.5
[51] Int. Cl. ............................................ H03f 7/04
[58] Field of Search................ 307/88.3; 321/69 R; 330/4.5

[56] References Cited
UNITED STATES PATENTS
3,297,875  1/1967  Garwin et al. ................. 307/88.3 X Primary Examiner—Alfred L. Brody
Assistant Examiner—Darwin R. Hostetter
Attorney, Agent, or Firm—Wilford L. Wisner

[57] ABSTRACT

An optical parametric amplifier is provided in a glassy material in optical waveguiding fiber form. The fiber is moderately multi-moded with respect to the intended pump and signal wavelengths, typically such that $\lambda_2 = 0.05$ to $0.1$ times the core diameter and $\lambda_p$ is marginally less than $\lambda_s$. The pump beam is injected into the fiber in two modes simultaneously by focusing it on the fiber with a spot size substantially smaller than the core diameter, illustratively less than one-half the core diameter. Coherence lengths for exponential parametric gain longer than 10 meters and gains more than double the usual Reman gain have been obtained this way.

9 Claims, 9 Drawing Figures

FOUR PHOTON PARAMETRIC AMPLIFICATION IN GLASSY OPTICAL WAVEGUIDES

BACKGROUND OF THE INVENTION

This invention relates to parametric amplification and frequency shifting at optical wavelengths.

Research interest in nonlinear optical effects for amplification or frequency shifting has apparently declined with the advent of broadband laser amplifiers, such as dye lasers, semiconductor lasers and high pressure gas lasers. Nevertheless, nonlinear parametric amplification can be one of the least noisy and most reproducible types of amplification for use at optical wavelengths. One of the reasons for the decline in interest in nonlinear optical effects is the increase of research interest in performing nearly all optical communication functions in waveguiding structures, such as fused silica optical fiber waveguides.

Recently, it was shown by the inventor and others that nonlinear optical effects with phase matching could be achieved in fused silica fibers by using the dispersion of waveguide modes to compensate for bulk dispersion, so that mixing over distances of about 10 cm could be achieved by the third order nonlinear optical effect in the fused silica fibers. This mixing is accompanied by a very small amplification of the weaker input beam. See "Phase-Matched Three Wave Mixing in Silica Fiber Optical Waveguides" by R. H. Stolen et al; *Applied Physics Letters*, Vol. 24, pp. 308–310 (1974). By bulk dispersion I mean the inherent characteristic of a particular material, in bulk, to propagate higher frequencies at lower phase velocities than lower frequencies and to do so with a nonconstant slope of velocity versus frequency over any appreciable frequency range. By waveguide dispersion I mean the tendency of a waveguide characteristically to propagate higher order modes at higher phase velocity than lower order modes. In that particular system one of the signal or idler waves was launched in a higher order mode if it would tend to propagate at too low a phase velocity relative to that of the pump wave in the same material in bulk to permit phase-matching. In general, in parametric mixing, these velocities are not equal, but should have a prescribed relationship for continuing energy transfer.

It would be desirable to extend the effective coherence length of such a nonlinear amplification process beyond the 10 cm length achieved in the cited reference. Such an achievement, for example, would result in significant amplification and would mean that the technique could compete as an alternative means of amplification for long distance transmission of optical communication signals in optical waveguides between widely separated points.

One of the apparent limitations of the above referenced technique is that all fused silica fibers, no matter how carefully drawn, vary slightly in diameter, particularly core diameter, along their length. In fact, in some cases diametral variations are deliberately introduced to overcome the problem of pulse broadening in optical PCM communication systems. Clearly, any practical nonlinear amplification technique to be achieved in the fused silica fiber itself must be tolerant of such variations in diameter.

SUMMARY OF THE INVENTION

I have discovered exponential parametric amplification of signal waves in fused silica fibers of more than 10 meters length. I have also discovered that for selected combinations of modes an improved or even optimum insensitivity to fiber diameter variations and imperfections is achieved.

Specifically, according to my invention an optical parametric amplifier is provided in a glassy waveguiding fiber that is moderately multi-moded with respect to the intended pump wavelength by launching the pump beam into the fiber in two modes simultaneously by focusing it on the fiber with a spot size substantially smaller than the core diameter, preferably with the spot diameter slightly less than one-half the core diameter.

According to a subsidiary feature of my invention, the signal beam is also launched into the fiber substantially collinearly with the pump beam and in a mode selected to facilitate phase-matching with the two pump modes in an interaction generating an idler wavelength differing from the pump wavelength in the opposite sense from the signal wavelength. In other words, I select the mode to facilitate the type of wavelength separation of pump, signal and idler that is in fact characteristic of four photon nonlinear parametric interactions. It was not previously known how to select modes as well for this purpose, especially in fibers.

According to a subsidiary feature of my invention, the signal beam launching means and pump beam launching means are mutually adapted to inject combinations of the selected signal mode and two pump modes minimizing sensitivity of the nonlinear process to fiber diametral variations and imperfections. Preferably, the signal frequency is lower than the pump frequency; and the signal beam is injected into the fiber in a mode of order higher than the lowest order mode.

Because the nonlinear parametric interaction is apparently Raman-assisted, it is advantageous that the signal wavelength is longer than the pump and idler wavelengths.

The foregoing features of the invention are particularly advantageous for amplification without frequency-shifting of a signal wavelength that is longer than both the pump and idler wavelengths, although frequency shifting is feasible with or without amplification.

According to another feature of my invention, a dispersive prism can be employed to separate the output beams generated in an apparatus according to my invention so that a frequency-shifted beam, namely the idler beam which bears the same information as the original signal beam can be detected or otherwise utilized.

According to a still further subsidiary feature of my invention, the signal beam launching means and pump beam launching means are mutually adapted for launching the signal beam in the same mode as the higher order pump mode, whereby the idler beam is inherently generated in the same mode as the lower order pump mode.

My invention also extends to alternative techniques for launching the pump beam in two modes simultaneously. For example, in selected cases this can be done by launching the beam into the fiber at a slight angle with respect to its axis or with a small spot size and a lateral offset with respect to the fiber axis.

BRIEF DESCRIPTION OF THE DRAWING

Further features and advantages of my invention will become apparent from the following detailed description taken together with the drawings in which.

DESCRIPTION OF ILLUSTRATIVE EMBODIMENT

Figure 1:
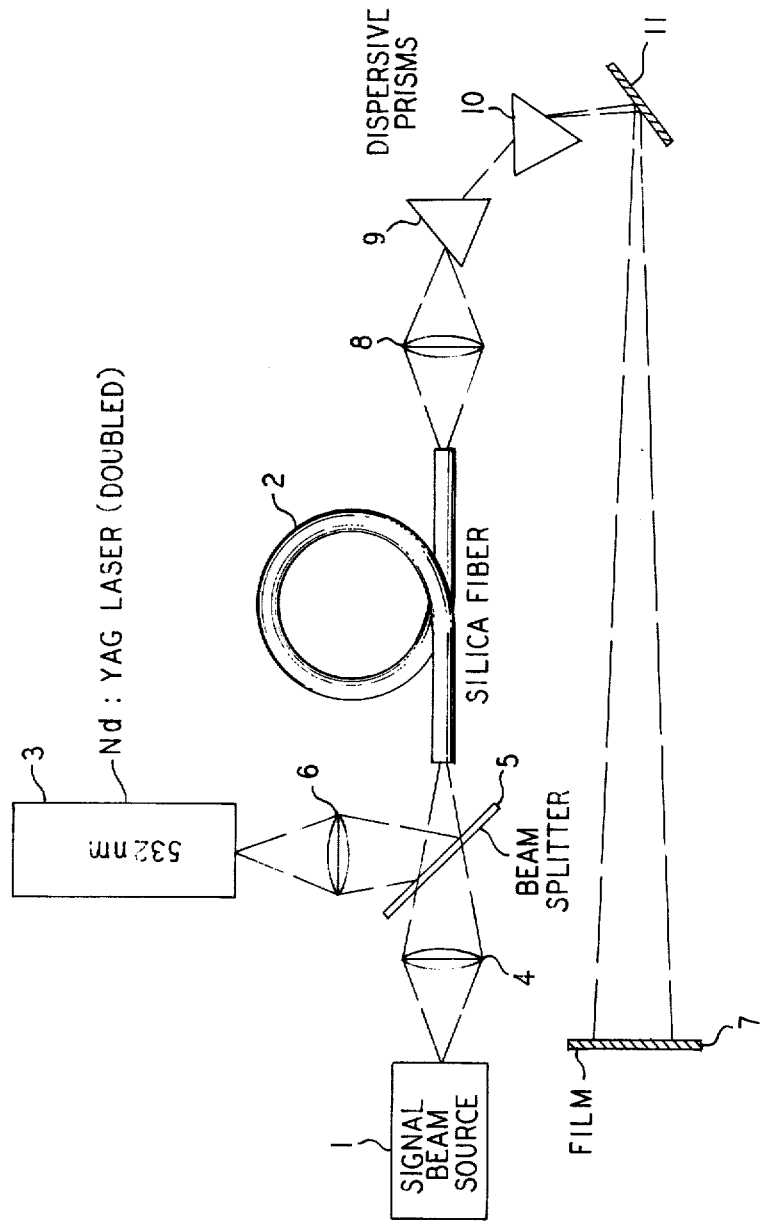
FIG. 1 is a partially pictorial and partially block diagrammatic illustration of a preferred embodiment of the invention.

In the apparatus of FIG. 1 it is desired to amplify a signal beam which for purposes of illustration will be assumed to be propagating from a source 1. Source 1 could be another fused silica fiber like fiber 2 used in the amplifier of the present invention; but that is not essential to my invention. To achieve the desired amplification by the technique that I have discovered, a pump beam is launched in the silica fiber 2 in two modes simultaneously from a source 3 which is a frequency-doubled Q-switched Nd:YAG laser of known type. Peak powers from source 3 in actual experimental verifications of my technique were between 100 and 500 watts.

This peak power was the power required to amplify spontaneous Raman noise up to a power comparable to that of the pump. For normal amplification of signals, pump powers of 50 watts or less would be necessary; and, with improved design and glasses with larger nonlinear coefficients, one can anticipate pump powers in a range as low as 1-5 watts providing effective amplification of mixing.

The fiber 2 is moderately multi-moded with respect to the intended pump and signal wavelengths. That is, the signal wavelength is approximately 0.05 to 0.1 times the core diameter of fiber 2; and the pump wavelength is also substantially in the same range, although it is in each case marginally less than the signal wavelength $\lambda_s$.

Illustratively, the signal beam from source 1 is launched into the end of fiber 2 at least partly in an $LP_{02}$ mode. Any of the lowest order $LP_{01}$ mode launched will not be amplified by my inventive technique and so represents a coupling loss. The $LP_{02}$ mode is launched by focusing it by lens 4 through the half-silvered mirror 5 onto the end of fiber 2 in line with the axis of fiber 2 and using a spot diameter slightly less than half the diameter of fiber 2. Modes are designated using the linearly polarized mode notations of D. Gloge, in his article "Weakly Guiding Fibers," *Applied Optics*, $1_0$, 2252 (1971). The pump beam from source 3 is launched into fiber 2 in two modes simultaneously, e.g., $LP_{01}$ and $LP_{02}$ by focusing it with lens 6 onto half-silvered mirror 5 for reflection at right angles into fiber 2 centered on axis of fiber 2 in alignment therewith and with a spot diameter slightly less than half the diameter of fiber 2.

The output from the fiber 2 is displayed on a film or screen 7 by collecting it with the lens 8, dispersing the differing frequency components with prisms 9 and 10, from which the beams are conveniently directed by a planar reflector 11 to the display plane of film or screen 7.

In my experimental verification of the operation of the embodiment of FIG. 1, in which four-photon parametric generation was observed with signal beam source 1 turned off, the basic observation was that stimulated Stokes-anti-Stokes pairs of photons are observed. An output, nevertheless, is observed in addition to the four-photon effect, the added effect being the well-known stimulated Raman output which in fused silica occurs at a frequency separation of about 460 $cm^{-1}$. The presence of an output wave which could be called the antiStokes wave, but which is much stronger than expected for a Raman scattering process, shows that the actual process occurring is predominantly a four-photon nonlinear parametric process in which two pump photons are destroyed and Stokes and antiStokes photons are created. Obviously, it can be asserted that the nonlinear process is Raman assisted; but I believe that the Raman component of the output is a minor portion thereof. Nevertheless, I do not wish to be bound by this explanation of my experimentally observed discoveries or limited with respect to the possible useful applications thereof.

FIGS. 2A-2D show the results for two silica core fibers.

Figure 2A:
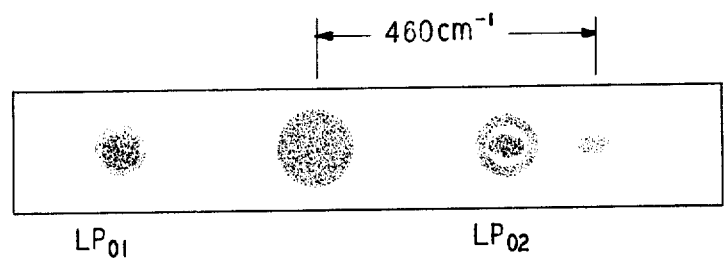
FIGS. 2A through 2D show approximate reproductions of photographs of the modes emitted from an apparatus according to my invention.
Figure 2B:
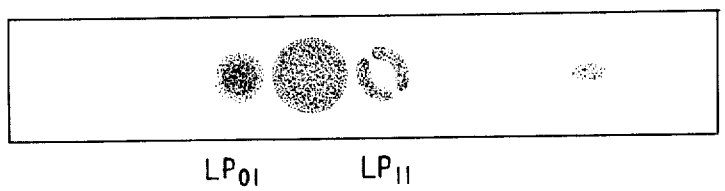
Figure 2C:
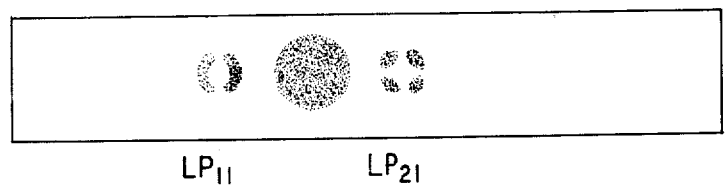
Figure 2D:
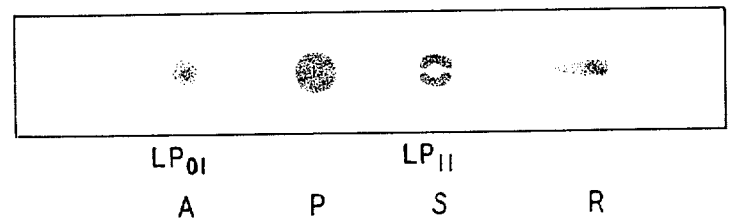

FIGS. 2A, 2B and 2C show spectrographic records of the output from a 5 mm long fiber with a 5 $\mu m$ core radius. In general, in FIGS. 2A through 2D the spectrographic order proceeds from shortest wavelength on the left to longest wavelength on the right. The two pump modes at 532 $\mu m$ overlap one another and are difficult to distinguish. Thus, they are both labeled P along a horizontal axis below FIGS. 2A through 2D. Similarly, A stands for anti-Stokes wave and S stands for the Stokes wave as recorded on the spectrographic records. The spot on the film designated as R is the non-phase-matched stimulated Raman radiation at approximately 460 $cm^{-1}$ from the pump frequency. The separation of anti-Stokes and Stokes wave from the pump in wavelength is greater in FIG. 2A than in FIGS. 2B through 2D. Indeed, the spacing varies slightly through the remaining FIGS. 2B through 2D, but the main story is told by the differing mode structures of the pump, Stokes and anti-Stokes waves.

A four-photon process requires phase matching; and in all cases this occurs with Stokes and anti-Stokes in different modes. The phase-matching frequency is different for different combinations of modes and for different fibers. The different pairs of modes were obtained by changing the coupling of the pump light into the fiber. Some of the pump propagates in the same mode as the Stokes and some in the same mode as the anti-Stokes. This fact does not show up clearly in the photographs. The Stokes wave is always in the higher order mode. The anti-Stokes intensity is always less than the Stokes intensity, with the strongest anti-Stokes observed close to the pump and no anti-Stokes seen at frequency shifts greater than 400 $cm^{-1}$. This is a consequence of the contribution of Raman gain to the four-photon intensities and will be discussed later.

Neutral density filters were used to attenuate everything but the anti-Stokes in FIGS. 2A - 2D. From the photograph it is clear that the four-photon gain is larger than the Raman gain. For a long fiber the non-phase matched Raman process will dominate because the coherence length for the four photon process is less than the fiber length. This fact was used to estimate the coherence length. Sections of fiber were then broken off until the four-photon process was the stronger. This length was taken to be the coherence length and was somewhere between 5 and 10 meters. For shorter lengths of fiber, the relative four-photon and Raman intensities remain about the same although more pump power is required to observe stimulated emission.

Figure 3A:
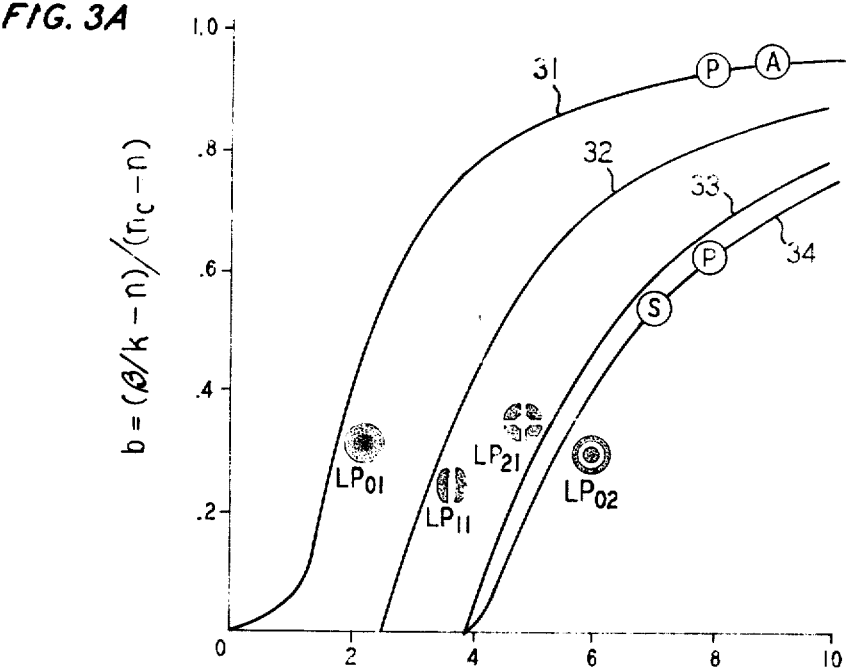
FIG. 3A shows curves that illustrate the principles of phase-matching according to my invention.

It is precisely the fact that the pump is divided between two different modes and that Stokes appears in one of these modes while anti-Stokes appears in the other which leads to the longest coherence lengths. In this section the method of calculating the phase-matching frequency for this process is illustrated. For comparison, the case where both pump photons are in the same mode is also treated. This latter type of process is characteristic of the phase-matched interactions observed in the above-cited previous mixing experiments. The divided-pump-mode processes will have much longer coherence lengths, as will be shown in the next section. The contribution of the waveguide modes to achieve phase matching can be understood by reference to FIGS. 3A and 3B where the effective index of four fiber modes is plotted vs. the characteristic number V which is proportional to frequency. In each case in FIGS. 3A and 3B the mode structure observed in a spectrographic record of a wave having the effective index vs. characteristic number V is shown immediately adjacent to the curve. Thus, curve 31 in FIG. 3A is for the $LP_{01}$ mode. Curve 32 is for the $LP_{11}$ mode, curve 33 is for the $LP_{21}$ mode and curve 34 is for the $LP_{02}$ mode.

In each case the mode shapes shown are for the linear polarized modes. The conservation of wave vector requires:

$$k_A + k_S - 2k_p = 0. \quad 1$$

but in bulk material this condition is not satisfied and
$K_s + K_s - 2k_p > O$.

This relation inhibits the desired transfer of energy, where $k_A$ and $k_S$ are the wave vectors of the high and low frequency waves and $k_p$ refers to the pump. In FIG. 4, $\Delta k$, where $\Delta k = k_p + k_s - 2k_p$, is plotted vs. $\Delta \bar{\nu}$ for fused silica; $\Delta \bar{\nu}$ is the frequency shift in units of $cm^{-1}$. In the guide each wave vector will be reduced slightly compared to the value in the bulk material. For example, the wave vector of light in the 01 mode will be reduced by $2\pi(1-b_{01}\bar{\nu})$ where $b$ is a normalized effective index and is defined in FIG. 3. In the approximation that the corecladding index difference $(n_c-n)$ is independent of wavelength, the result is to add to Eq. (1) another contribution to $k_A + k_S - 2k_p$ which we call $f(\Delta \bar{\nu})$ $$2\pi(n_c-n)(b_A\bar{\nu}_A+b_S\bar{\nu}_S-b_p\bar{\nu}_p-b_p\bar{\nu}_p)) = f(\Delta \bar{\nu}). \quad (2)$$

Consider the process illustrated in FIG. 3A. Here the pump power is divided between the 01 and 02 modes. Stokes is in the 02 mode and anti-Stokes in 01 which corresponds to observation. Expanding $b_S\bar{\nu}$ and $b_A\bar{\nu}_S$ and $b_A\bar{\nu}_A$ about $b_p\bar{\nu}_p$, using the definitions of V in FIG. 2, and neglecting terms in $\Delta \bar{\nu}^2$ Eq. (2) reduces to $$f(\Delta\bar{\nu}) = 2\pi(n_c-n)\left[\frac{d(b_{01}V)}{dV} - \frac{d(b_{02}V)}{dV}\right]\Delta\bar{\nu}. \quad (3)$$

The quantity $d(bV)/dV$ happens to be the normalized group delay and plots have been published for a simple waveguide structure. At phase-matching $f(\Delta\bar{\nu})+\Delta k(\Delta\bar{\nu}) = 0$. On FIG. 4A $f(\Delta\bar{\nu})$ is plotted on the same scale as $\Delta k(\Delta\bar{\nu})$. The parameters used are taken from FIG. 3 which were calculated for a fiber of 5 $\mu$m core radius and $n_c-n = 0.006$. For comparison the similar process with Stokes $LP_{11}$, anti-Stokes $LP_{01}$ and pump $LP_{01}$ and $LP_{11}$ is also included. This process is phase-matched at a smaller frequency shift.

Figure 3B:
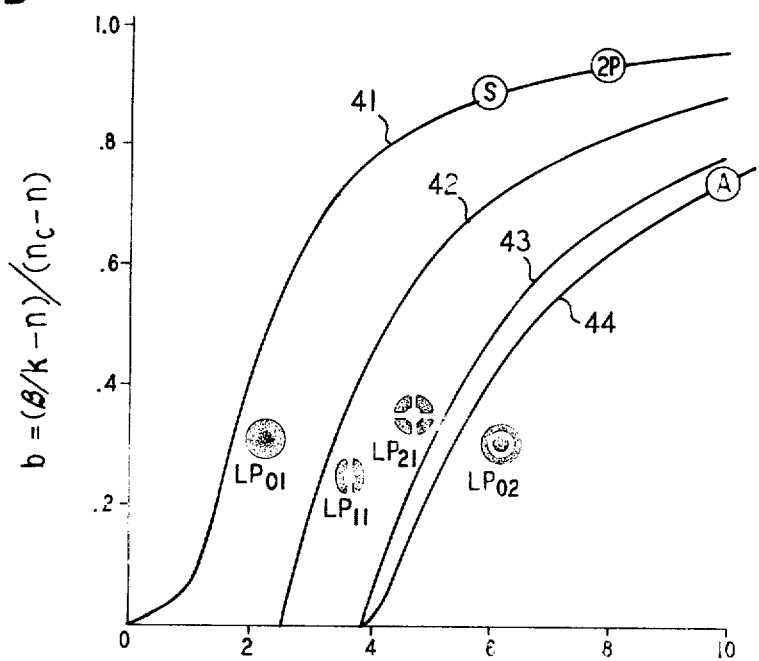
FIG. 3B shows curves illustrating the principles of phase-matching of the above designated reference.
Figure 4A:
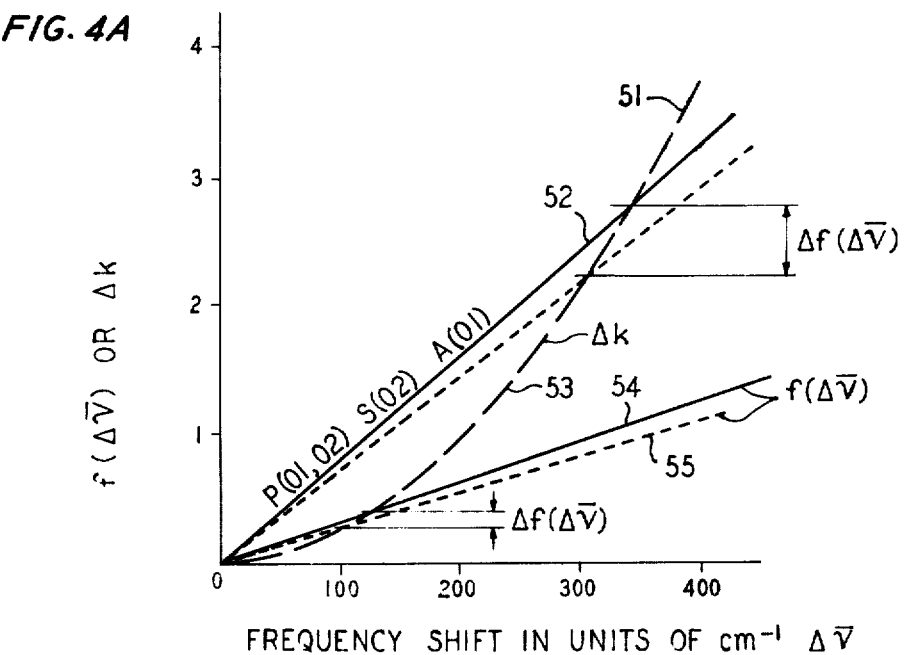
FIGS. 4A and 4B show curves further illustrating other aspects of the operation of the invention.

FIG. 3B shows the comparable situation for the prior four-photon three wave phase-matching in which the pump mode was launched only in a single mode. Thus, the highest circle on curve 41 represents two pump photons injected in the same mode and thus having the same effective index and characteristic number. Specifically, the pump wave is only in the $LP_{01}$ mode, anti-Stokes in the $LP_{02}$ mode and Stokes in the $LP_{01}$ mode. Symmetry considerations rule out combinations of $LP_{01}$ and $LP_{11}$ modes. Again using a linear expansion conservation of energy requires:

$$f(\Delta\bar{\nu}) = 2\pi(n_c-n)\left[(b_{02}-b_{01})\bar{\nu}_p+\left(\frac{d(b_{02}V)}{dV} - \frac{d(b_{01}V)}{dV}\right)\Delta\bar{\nu}\right]. \quad (4)$$

This curve is plotted in FIG. 4B, again for the case of the 5 $\mu$m core fiber. For a fiber supporting several modes there will be many phase-matching combinations similar to those in FIG. 3. In general, processes of type 3B will occur at much greater frequency shifts than those like 3A, but with shorter coherence lengths. The mode labeled 11 in the photograph does not usually have the linearly polarized mode shape shown in FIG. 3. This mode is actually a combination of three almost degenerate modes each of which has a "doughnut" intensity profile. Depending on the input coupling it seems to be possible to excite these in various combinations; and patterns have been observed ranging all the way from the two lobe $LP_{11}$ shape to a doughnut. In general, the process illustrated by curves 41-44 of FIG. 3B leads to relatively short coherence length of about 10 cm and overall gains which are not competitive with other available amplification or frequency shifting techniques.

The most interesting feature of the stimulated four-photon emission is the long coherence length. Previously, processes like FIG. 3B were studied in the 5 $\mu$m core fiber; and a coherence length of only 10 cm was found. This length depends on the fluctuations in diameter and $(n_c-n)$ which occur in any guide. Even if perfect phase matching were achieved at the beginning of a long guide, there will be some point where conditions have changed. Changes in V will result in changes in $f(\Delta\bar{\nu})$ illustrated by the dotted lines in FIGS. 4A and 4B. As a rough definition of the coherence length $L_c$ we use the condition that:

$$\delta k L_c = \delta[f(\Delta\bar{\nu})+\Delta k(\Delta\bar{\nu})]L_c \approx \pi. \quad (5)$$

The two different types of processes described by Eqs. (3) and (4) differ remarkably in their sensitivity to guide imperfections. If fluctuations in the core radius, A, are most important then since $dV/da = V/a$ then from Eq. (3):

$$\delta k = 2\pi(n_c-n)\left[\frac{d^2(b_{01}V)}{dV^2} - \frac{d^2(b_{02}V)}{dV^2}\right]\Delta\bar{\nu}\ \frac{V}{a}\ \delta a \quad (6)$$

and from Eq. (4):

$$\delta k = 2\pi(n_c-n)\left[\bar{\nu}_\mu\frac{d(b_{02}-b_{01})}{dV} + \Delta\bar{\nu}\left(\frac{d^2(b_{02}V)}{dV^2} - \frac{d^2(b_{01}V)}{dV^2}\right)\right]\frac{V}{a}\ \delta a \quad (7)$$

The first term in Eq. (7) dominates primarily because of the difference between $\bar{\nu}_\mu$ and $\Delta\bar{\nu}$. The fiber used in the prior technique of FIG. 3B had: $a = 5\ \mu m$, $n_c-n = 0.006$ and $\delta a/a \approx 0.2$ percent. The calculated coherence length for processes like FIG. 3B was 5 cm as compared to the measured 10 cm.

In contrast, in the type processes of my invention, as illustrated in FIG. 3A, the dominant term $\bar{\nu}_\mu d(b_{02}-b_{01})/dV$ drops out. For the same 5 $\mu m$ core fiber, the Stokes LP$_{02}$, anti-Stokes LP$_{01}$ combination should have $L_c = 5$ meters and for Stokes in LP$_{11}$ mode and anti-Stokes in LP$_{01}$ mode, then $L_c = 29$ meters.

The long coherence length can be made even longer by a suitable choice of fiber parameters. From Eq. (6) it can be seen that if a phase-matched process occurs where $d[d(b_{01}V)/dV-d(b_{02}V)/dV]dV=0$ then at least to first order this process would be insensitive to fluctuations in core diameter. When $d(bV)dV$ is plotted vs. V for different modes, it is apparent that this condition can be satisfied.

The Stokes gain for the four-photon process is larger than the ordinary Raman gain as is readily seen from the photographs in FIG. 2. The nonphasematched Raman gain can be viewed as the imaginary part of a complex susceptibility, X''. The real third order susceptibility X' makes possible the four photon process. For fused silica the maximum value of X'' at 460 cm$^{-1}$ as determined from the Raman gain curve is $0.5 \times 10^{-13}$esu. The value of X' has been reported to be about $5 \times 10^{-13}$esu. In both processes the exponential gain, $g$, is proportional to the susceptibility; $I(L) = I(0)$ exp $(gPL)$ where L is the interaction length and P the pump power. The four-photon gain is not an order of magnitude larger than the Raman gain as might at first be expected from the difference in susceptibilities. The relevant susceptibility is in each case multiplied by a degeneracy factor, which for two pump photons at the same frequency, is 6 for Raman gain and 3 for four-photon gain. To calculate the gain in the fiber it is also necessary to integrate over the products of the mode fields. In general, this overlap integral is a factor of two less for the multimode four-photon process than for the case of Raman gain with both pump and signal in the lowest order guide mode. If these two factors are combined the four-photon gain is expected to be between two and three times the peak Raman gain for fused silica.

At frequencies less than 1,000 cm$^{-1}$ from the pump the four-photon gain is complicated somewhat by X''. If X'' were negligible the Stokes and anti-Stokes intensities would be the same. The effect of X'' is to increase the amplification of Stokes and to absorb anti-Stokes. This explains the difference between the observed anti-Stokes and Stokes intensities. The real part of the susceptibility is also slightly frequency dependent in the frequency range of interest since X' will be affected by X'' through the Kramers Kronig relations. At low frequency shifts X' will be about 5 percent higher than the high frequency value while X' will be depressed by about 5 percent around 500 cm$^{-1}$. In principle, the ratio of anti-Stokes and Stokes can be used to determine X''/X' at various frequency shifts. This is complicated by the need to calculate overlap integrals.

To obtain some feeling for the amplification possible, we choose a multimode fiber 10 meters in length and with a 5 $\mu m$ core radius. If we assume that the gain is 2.5 times the peak Raman gain this means that a pump power of 50 watts will result in a power amplification of $e^3$. The amplifier bandwidth for my invention can be determined from the relative slopes of $f(\Delta\bar{\nu})$ and $\Delta k(\Delta\bar{\nu})$ in curves S1-55 of FIG. 4A. We define the bandwidth $\delta\bar{\nu}$ by:

$$\frac{d}{d(\Delta\bar{\nu})}[f(\Delta\bar{\nu})+k(\Delta\bar{\nu})]\delta\bar{\nu}L = \pi \quad (8)$$

Figure 4B:
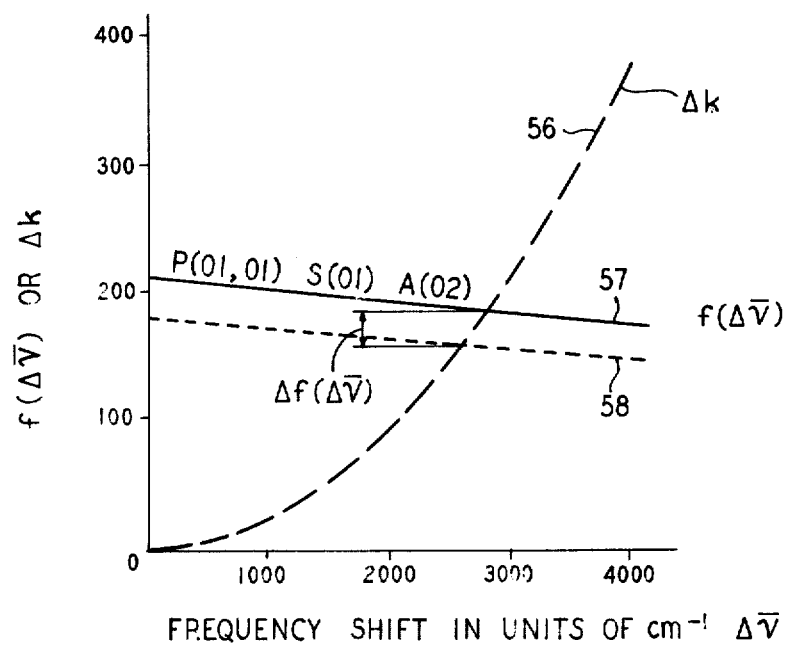

For the high frequency processes of FIG. 3B the dominant term is $d(\Delta k)/d(\Delta\bar{\nu})$ and leads to the relatively smaller frequency band $\Delta f(\Delta\bar{\nu})$ indicated in FIG. 4B between curves 57 and 58 for the prior techniques. For those processes of my invention as shown in FIG. 3A, the slopes of $f(\Delta\bar{\nu})$ and $\Delta k$ are similar in FIG. 4A, and the condition becomes:

$$\left(\frac{d(\Delta k)}{d(\Delta\bar{\nu})} - \frac{\Delta k}{\Delta\bar{\nu}}\right)\delta\bar{\nu}L = \pi \quad (9)$$

Again using the index data for fused SiO$_2$ and choosing a length of 10 meters, the bandwidth of my invention at a frequency 100 cm$^{-1}$ from a 500 nm pump will be 1.4 cm$^{-1}$ figured from the intersections of curves 53 and 52 with curve 51. At 500 cm$^{-1}$, it will be 0.27 cm$^{-1}$ figured from the intersections of curves 54 and 55 with curve 51. In contrast, for a higher frequency shift process at 3,000 cm$^{-1}$, $\delta\bar{\nu}$ is $2.2 \times 10^{-3}$ cm$^{-1}$ as shown in FIG. 4B for the prior technique.

In general, the observation of stimulated four photon mixing demonstrates that extremely long coherence lengths are possible for phase matched nonlinear interactions in optical waveguides. The observed coherence lengths are two orders of magnitude larger than anything previously observed in solids. High amplification and broad bandwidths are possible using the four-photon interaction as an amplifier. The gain coefficient is more than double the non-phase matched Raman gain. Other glasses might be expected to have even larger gains.

What is claimed is:

1. An active optical device comprising a glassy optical waveguiding fiber dimensioned to be moderately multi-moded with respect to the intended signal wavelength and the intended pump wavelength, means for launching into said fiber a beam of said signal wavelength in a selected mode, and means for launching into said fiber a beam of said pump wavelength in two modes simultaneously to generate an idler wavelength differing from said pump wavelength in the opposite sense from said signal wavelength.

2. An active optical device according to claim 1 in which the signal beam launching means and the pump beam launching means are mutually adapted to launch combinations of a signal mode and two pump modes yielding relative insensitivity to fiber imperfections including fiber diametral variations.

3. An active optical device according to claim 1 including means for yielding the lowest frequency beam in a mode of order higher than lowest order mode.

4. An active optical device according to claim 3 in which the signal wavelength is selected to have the lowest frequency, and the signal launching means comprises means for launching the signal beam in a mode of order higher than the lowest order mode.

5. An optical amplifier comprising a glassy optical waveguiding fiber dimensioned to be moderately multi-moded with respect to the intended signal wavelength and the intended pump wavelength, means for launching into said fiber a signal beam of frequency lower than the pump frequency and in a mode of order higher than the lowest and means for launching into said fiber a beam of said pump wavelength in two modes simultaneously to obtain substantial amplification of said signal beam together with generation of an idler wave of frequency higher than said signal and pump frequencies.

6. An optical amplifier according to claim 5 including means for separating the signal and idler beams propagating from the fiber, whereby the idler beam bears the same information as the signal beam in frequency-shifted form and can be separately detected.

7. An optical amplifier according to claim 5 in which the signal beam launching means and pump beam launching means are mutually adapted for launching the signal beam in the same mode as the higher order pump mode, whereby the idler beam is inherently generated in the same mode as the lower order pump mode.

8. An optical amplifier according to claim 7 in which the pump and signal beam injecting means include in common means for focusing both of said beams in axial alignment onto the end of the fiber with spot diameters no greater than half the fiber core diameter, whereby the higher order pump mode and signal mode are $LP_{02}$.

9. An active optical device comprising a glassy optical waveguiding fiber dimensioned to be moderately multi-moded with respect to the intended pump wavelength, and means for injecting into said fiber a beam of said pump wavelength in two modes simultaneously to generate signal and idler wavelengths differing from said pump wavelength in opposite senses and differing in modes.

* * * * *